United States Patent
Dearing et al.

(10) Patent No.: US 8,826,243 B2
(45) Date of Patent: Sep. 2, 2014

(54) SYSTEM, METHOD, AND COMPUTER PROGRAM PRODUCT FOR ERROR CODE INJECTION

(75) Inventors: Gerard M. Dearing, San Jose, CA (US); Terri A. Menendez, Morgan Hill, CA (US)

(73) Assignee: International Business Machines Corporation, Armonk, NY (US)

(*) Notice: Subject to any disclaimer, the term of this patent is extended or adjusted under 35 U.S.C. 154(b) by 571 days.

(21) Appl. No.: 12/968,135

(22) Filed: Dec. 14, 2010

(65) Prior Publication Data

US 2012/0151268 A1 Jun. 14, 2012

(51) Int. Cl.
*G06F 9/44* (2006.01)
*G06F 11/36* (2006.01)

(52) U.S. Cl.
CPC ........ *G06F 11/3672* (2013.01); *G06F 11/3624* (2013.01); *G06F 11/3684* (2013.01); *G06F 11/3696* (2013.01)
USPC .......................................... 717/130; 717/124

(58) Field of Classification Search
CPC ............ G06F 11/3466; G06F 11/3636; G06F 2201/865
See application file for complete search history.

(56) References Cited

U.S. PATENT DOCUMENTS

| | | | |
|---|---|---|---|
| 6,477,666 B1 | 11/2002 | Sanchez et al. | |
| 6,643,769 B1* | 11/2003 | Huck et al. | 712/227 |
| 6,701,460 B1 | 3/2004 | Suwandi et al. | |
| 7,114,164 B2* | 9/2006 | Smith et al. | 719/318 |
| 7,457,723 B2* | 11/2008 | Zhu et al. | 702/182 |
| 7,536,605 B2 | 5/2009 | Keaffaber et al. | |
| 8,127,277 B2* | 2/2012 | Albot et al. | 717/127 |
| 2004/0243882 A1* | 12/2004 | Zhou | 714/38 |
| 2005/0169185 A1* | 8/2005 | Qiu et al. | 370/241 |
| 2006/0143540 A1 | 6/2006 | Burk | |
| 2006/0271825 A1* | 11/2006 | Keaffaber et al. | 714/38 |
| 2008/0215925 A1 | 9/2008 | Degenaro et al. | |
| 2008/0256517 A1* | 10/2008 | Atkin et al. | 717/124 |
| 2010/0287535 A1* | 11/2010 | Kim et al. | 717/127 |
| 2012/0017285 A1* | 1/2012 | Piwonka et al. | 726/27 |

OTHER PUBLICATIONS

Wikipedia, "Abnormal end," http://en.wikipedia.org/w/index.php?title=Abnormal_end&oldid=400378264, Dec. 3, 2010, last accessed Jun. 14, 2013.*
Davis et al., "Software Test Engineering with IBM Rational Functional Tester: The Definitive Resource," IBM Press, Oct. 23, 2009.*

(Continued)

*Primary Examiner* — Qing Chen
*Assistant Examiner* — Andrew M Lyons
(74) *Attorney, Agent, or Firm* — Zilka-Kotab, PC (57) ABSTRACT

In one embodiment, a computer program product for injecting error code includes a computer readable storage medium having computer readable program code embodied therewith. The computer readable program code includes computer readable program code configured to determine critical points in executing code of software under test, computer readable program code configured to determine an appropriate response action for each critical point based on an error encountered at each critical point, computer readable program code configured to inject a critical point segment into the executing code at a corresponding critical point, and computer readable program code configured to output a unique identifier of each critical point segment. In another embodiment, a system includes a processor, and a computer readable storage medium having computer readable program code embodied therewith having the above described functionality. Other systems and computer program products are described according to more embodiments.

20 Claims, 3 Drawing Sheets

(56) References Cited

OTHER PUBLICATIONS

Shirakyan et al., "Source Code Instrumentation Technique for Injecting Data into Variables," Microsoft, Sep. 26, 2008, IPCOM000174925D.*

Bieman et al., "Using Fault Injection to Increase Software Test Coverage," IEEE, Proceedings of the Seventh International Symposium on Software Reliability Engineering. Oct. 30-Nov. 2, 1996, p. 166-174.

International Search Report and Written Opinion from PCT Application No. PCT/EP2011/072626 dated Feb. 21, 2012.

Jiang et al., "An Approach to Automatic Testing Exception Handling," ACM SIGPLAN Notices, vol. 40, No. 8, Aug. 2005, pp. 34-39.

Ziade et al., "A Survey on Fault Injection Techniques," The International Arab Journal of Information Technology, vol. 1, No. 2, Jul. 2004, pp. 171-186.

* cited by examiner

SYSTEM, METHOD, AND COMPUTER PROGRAM PRODUCT FOR ERROR CODE INJECTION

BACKGROUND

The present invention relates to system and software testing, and more particularly, to a system, method, and computer program product for error code injection to aid in system and software testing.

There are many types of commercial mainframe computers installed in different applications across many industries, such as mainframes running IBM's z/OS (operating system). These mainframes are typically subjected to testing in order to ensure proper functioning and/or to correct a problem or issue which may arise time to time during normal operation.

BRIEF SUMMARY

In one embodiment, a computer program product for injecting error code includes a computer readable storage medium having computer readable program code embodied therewith. The computer readable program code includes computer readable program code configured to determine critical points in executing code of software under test, computer readable program code configured to determine an appropriate response action for each critical point based on an error encountered at each critical point, computer readable program code configured to inject a critical point segment into the executing code at a corresponding critical point, and computer readable program code configured to output a unique identifier of each critical point segment.

In another embodiment, a system includes a processor, and a computer readable storage medium having computer readable program code embodied therewith. The computer readable program code includes computer readable program code that when executed by the processor, causes the system to determine critical points in executing code of software under test, computer readable program code that when executed by the processor, causes the system to determine an appropriate response action for each critical point based on an error encountered at each critical point, computer readable program code that when executed by the processor, causes the system to inject a critical point segment into the executing code at a corresponding critical point, and computer readable program code that when executed by the processor, causes the system to output a unique identifier of each critical point segment.

In another embodiment, a computer program product for executing injected error code includes a computer readable storage medium having computer readable program code embodied therewith. The computer readable program code includes computer readable program code configured to receive a unique identifier of each critical point segment injected into an executing code of software under test, computer readable program code configured to determine a critical point corresponding to each unique identifier in the executing code of the software under test, and computer readable program code configured to execute an appropriate response action for each critical point as the critical point is accessed in the executing code.

Other aspects and embodiments of the present invention will become apparent from the following detailed description, which, when taken in conjunction with the drawings, illustrates by way of example the principles of the invention.

DETAILED DESCRIPTION

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

The following description describes methods and systems for injecting primary error code and/or wait commands into executing code, according to various embodiments.

According to one embodiment, a method includes identifying and injecting a primary problem into executing code, at will, which allows for full testing of recovery steps at the critical point, as desired.

One problem with conventional testing techniques is related to methods for injecting errors, controlling timing, and/or enabling other desired code processing, into executing software programs. This type of control over the software, has many advantages, such as aiding in the development of the software, improved testing capabilities, practicing recovery procedures, enabling performance measurements, etc. For example, software programs frequently encounter unexpected errors, and in order to recover from these unexpected errors, recovery steps must be executed, including capturing documentation, externalizing the error, clearing held resources, etc. In too many instances, the recovery steps may fail, and many times the failed recovery steps may cause more severe problems to occur than those which were caused by the original (primary) error.

In addition, waiting for the primary error to occur again, naturally, in order to revisit the situation in an attempt to solve the underlying cause of the error, is not an efficient method of testing. The primary error may not occur naturally often enough to adequately troubleshoot the conditions surrounding the error prior to product delivery and/or usage, in which case the product may not be properly tested.

According to one embodiment, a method includes identifying troublesome timing conditions and injecting a wait command into executing code to allow for user input at these points. To describe situations where this is helpful, another example is presented which relates to software programs which allow for multiple processing code paths. These multipath software programs often encounter errors and/or deadlock situations related to timing conditions. Again, waiting for these timing conditions to occur naturally, as discussed earlier, is not efficient from a testing standpoint, as they may not occur frequently enough for adequate testing prior to product delivery and/or usage. By having a method to inject wait commands into the code paths, timing conditions can be artificially controlled, and this allows for testing and/or analysis of the code logic at the critical point.

According to preferred embodiments, the injection methods described above are applicable to any environment which the software programs are executing, and the method may be fully automatable. Other attempts to provide some form of error injection exist, but they are applicable only to limited environments, are impractical to use, and are not automatable. For example, some conventional methods use previously coded exit points as error injection points, and the method to trigger the points must constantly be updated to determine the offsets of the exit points.

In one general embodiment, a computer program product for injecting error code includes a computer readable storage medium having computer readable program code embodied therewith. The computer readable program code includes computer readable program code configured to determine critical points in executing code of software under test, computer readable program code configured to determine an appropriate response action for each critical point based on an error encountered at each critical point, computer readable program code configured to inject a critical point segment into the executing code at a corresponding critical point, and computer readable program code configured to output a unique identifier of each critical point segment.

In another general embodiment, a system includes a processor, and a computer readable storage medium having computer readable program code embodied therewith. The computer readable program code includes computer readable program code that when executed by the processor, causes the system to determine critical points in executing code of software under test, computer readable program code that when executed by the processor, causes the system to determine an appropriate response action for each critical point based on an error encountered at each critical point, computer readable program code that when executed by the processor, causes the system to inject a critical point segment into the executing code at a corresponding critical point, and computer readable program code that when executed by the processor, causes the system to output a unique identifier of each critical point segment.

In another general embodiment, a computer program product for executing injected error code includes a computer readable storage medium having computer readable program code embodied therewith. The computer readable program code includes computer readable program code configured to receive a unique identifier of each critical point segment injected into an executing code of software under test, computer readable program code configured to determine a critical point corresponding to each unique identifier in the executing code of the software under test, and computer readable program code configured to execute an appropriate response action for each critical point as the critical point is accessed in the executing code.

According to another embodiment, a software error injection service may provide a set of interfaces which identify critical points (also referred to as trigger points), and a set of commands to enable/disable the critical points as desired. The command interface communicates with previously coded critical points without a software developer/tester knowing code levels or offsets. The commands to enable/disable the critical points can be easily automated via existing automation services into test scenarios, allowing for continuous and repeatable testing. The interfaces provided with this service are built on top of the platform (operating systems) where the software programs execute, allowing for use of the service on any system where the software programs are executing, regardless of location. The decoupling of the critical points from the code levels/offsets, the automation capabilities of the command interface, and general use of the service are beneficial to efficiently implementing the testing and analysis.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as "logic", a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 1:
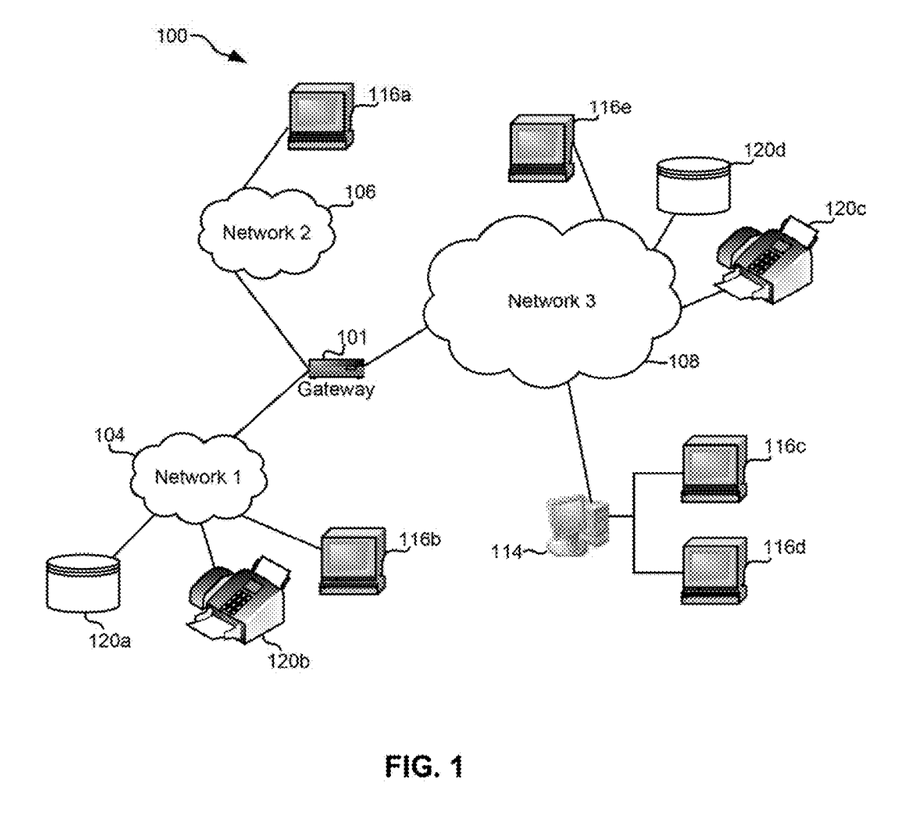
FIG. 1 illustrates a network architecture, in accordance with one embodiment.

FIG. 1 illustrates a network architecture 100, in accordance with one embodiment. As shown in FIG. 1, a plurality of remote networks are provided including a first remote network 104 and a second remote network 106. A gateway 101 may be coupled between the remote networks and a proximate network 108. In the context of the present network architecture 100, the remote networks 104, 106 may each take any form including, but not limited to a LAN, a WAN such as the Internet, PSTN, internal telephone network, etc.

In use, the gateway 101 serves as an entrance point from the remote networks to the proximate network 108. As such, the gateway 101 may function as a router, which is capable of directing a given packet of data that arrives at the gateway 101, and a switch, which furnishes the actual path in and out of the gateway 101 for a given packet.

Further included is at least one data server 114 coupled to the proximate network 108, and which is accessible from the remote networks via the gateway 101. It should be noted that the data server(s) 114 may include any type of computing device/groupware. Coupled to each data server 114 is a plurality of user devices 116a-116e. Such user devices 116a-116e may include a desktop computer, lap-top computer, hand-held computer, printer or any other type of logic. It should be noted that a user device 116e may also be directly coupled to any of the networks, in one embodiment.

A peripheral 120a or series of peripherals 120a-120d, e.g., facsimile machines, printers, networked and/or local storage units or systems, etc., may be coupled to one or more of the networks 104, 106, 108. It should be noted that databases and/or additional components may be utilized with, or integrated into, any type of network element coupled to the networks 104, 106, 108. In the context of the present description, a network element may refer to any component of a network.

According to some approaches, methods and systems described herein may be implemented with and/or on virtual systems and/or systems which emulate one or more other systems, such as a UNIX systems which emulates an IBM z/OS environment, a UNIX system which virtually hosts a MICROSOFT WINDOWS environment, a MICROSOFT WINDOWS system which emulates an IBM z/OS environment, etc. This virtualization and/or emulation may be enhanced through the use of VMWARE software, in some embodiments.

In more approaches, one or more networks 104, 106, 108, may represent a cluster of systems commonly referred to as a "cloud." In cloud computing, shared resources, such as processing power, peripherals, software, data, servers, etc., are provided to any system in the cloud in an on-demand relationship, thereby allowing access and distribution of services across many computing systems. Cloud computing typically involves an Internet connection between the systems operating in the cloud, but other techniques of connecting the systems may also be used.

Figure 2:
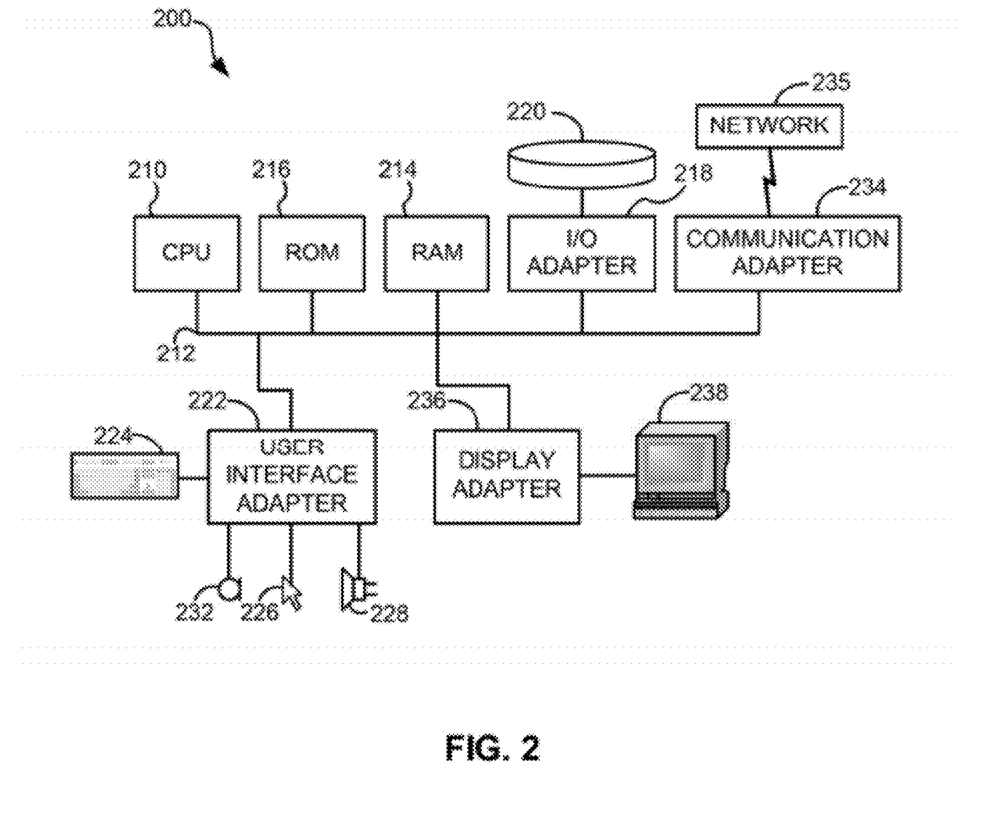
FIG. 2 shows a representative hardware environment that may be associated with the servers and/or clients of FIG. 1, in accordance with one embodiment.

FIG. 2 shows a representative hardware environment associated with a user device 116 and/or server 114 of FIG. 1, in accordance with one embodiment. Such figure illustrates a typical hardware configuration of a workstation having a central processing unit 210, such as a microprocessor, and a number of other units interconnected via a system bus 212.

The workstation shown in FIG. 2 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen and a digital camera (not shown) to the bus 212, communication adapter 234 for connecting the workstation to a communication network 235 (e.g., a data processing network) and a display adapter 236 for connecting the bus 212 to a display device 238.

The workstation may have resident thereon an operating system such as the Microsoft Windows® Operating System (OS), a MAC OS, a UNIX OS, etc. It will be appreciated that a preferred embodiment may also be implemented on platforms and operating systems other than those mentioned. A preferred embodiment may be written using JAVA, XML, C, and/or C++ language or other programming languages, along with an object oriented programming methodology. Object oriented programming (OOP), which has become increasingly used to develop complex applications, may be used.

Figure 3:
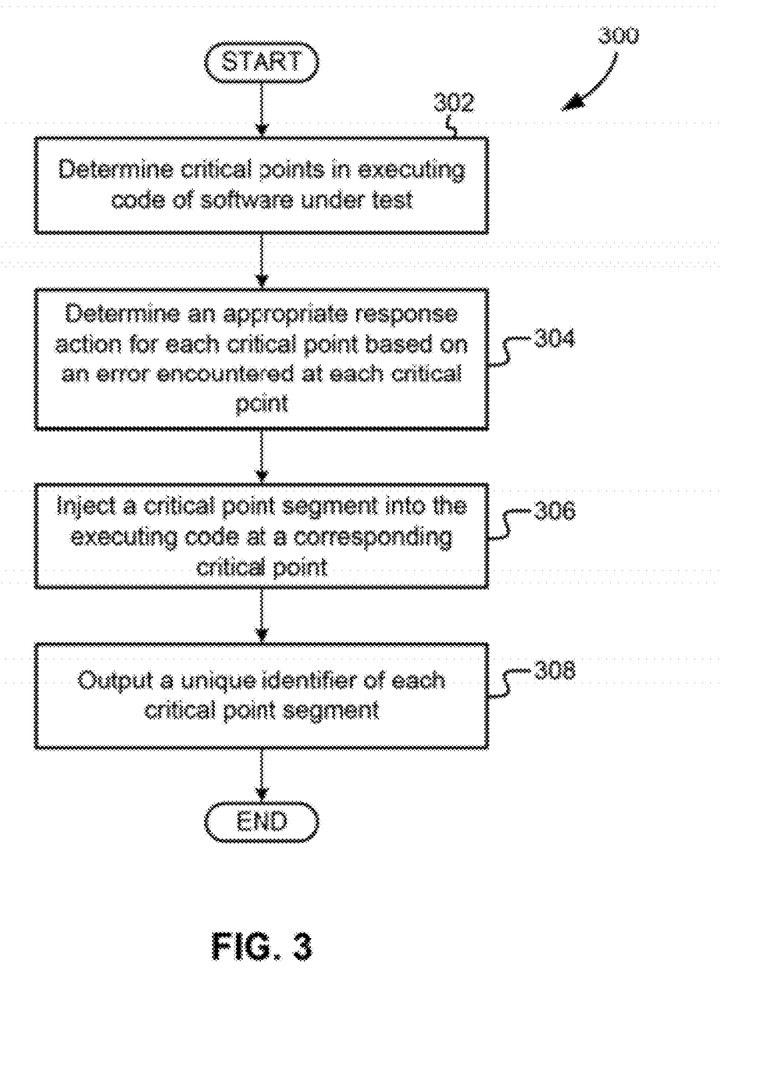
FIG. 3 is a flow diagram of a method for error code injection, according to one embodiment.

Now referring to FIG. 3, a method 300 is shown for injecting error code into executing code, according to one embodiment. Of course, the method 300 may include more or fewer operations than those described below and shown in FIG. 3, as would be apparent to one of skill in the art upon reading the present descriptions. Also, the method 300 may be performed in any desired environment, and may involve systems, components, etc., as described in regard to FIGS. 1-2, among others.

Referring again to FIG. 3, in operation 302, critical points in executing code of software under test are determined. In one approach, a software developer/tester may determine these critical points according to techniques known to those of skill in the art. In an alternate embodiment, the critical points may be determined automatically based on a response of the executing code of the software under test, such as hangs, failures, unexpected results, etc.

In operation 304, an appropriate response action is determined for each critical point based on the nature of an error encountered at each critical point.

In operation 306, a critical point segment is injected into the executing code at a corresponding critical point. The critical point segment uniquely identifies the critical point, thereby providing unique identifiers for all critical points in the executing code of the software under test.

According to one embodiment, the critical point segment may include code for executing the appropriate response action determined for each critical point. For example, response actions may include abend, wait, test a variable, etc.

In another embodiment, the critical point segment may limit access to one or more critical points to one or more specific callers of the software program.

In operation 308, the unique identifier is output for each critical point segment, possibly to the software developer/tester, another user, a remote system, etc. In further embodiments, code for executing the appropriate response action determined for each critical point may be communicated to the software developer/tester as well.

Optionally, a testcase may be built to invoke the software program based on at least the unique identifier of each critical point. The testcase is also capable of issuing commands to enable the critical points.

In one approach, the software developer/tester may build the testcase. In another approach, the testcase may be built automatically based on the critical points.

In some embodiments, each command may reference a unique identifier of one or more critical points, and may also determine the action to be taken and any specific callers of the software program. Additionally, in some approaches, each command may limit how the critical point remains active, such as by limiting the number of times to access and/or a number of times to skip a critical point between accessing the critical point.

The method 300 may be referred to as a software error injection service, in some approaches.

In one illustrative embodiment, the software error injection service operates by first having the software developer/tester identify the critical points in the software program under development. Once the critical points are identified, and the appropriate action to be taken is determined, a critical point code segment is added, which identifies each point with a unique id, and optionally defines the action to be taken (i.e. abend, wait, or test a variable). It can also limit this critical point to specific callers of the software program. Once the critical points are set, the unique id and desired action are communicated to the tester, who then builds a testcase to invoke the software program and to issue the commands to enable the critical points. The command references the unique id, and can also determine the action to be taken and any specific callers of the software program. It can also limit how the critical point remains active, such as by limiting the number of times to access a critical point, a number of times to skip a critical point, and/or a number of times to skip a critical point between accessing the critical point, etc.

In another embodiment, a computer program product for injecting error code includes a computer readable storage medium having computer readable program code embodied therewith. The computer readable program code includes computer readable program code configured to determine critical points in executing code of software under test, to determine an appropriate response action for each critical point based on an error encountered at each critical point, to inject a critical point segment into the executing code at a corresponding critical point, and to output a unique identifier of each critical point segment.

In one approach, the computer program product may further include computer readable program code configured to build a testcase to invoke the software under test based on at least the unique identifier of each critical point segment. This testcase may be automatically built based on the critical points, or may be assembled by a software developer/tester on site or from a remote location.

In another approach, the testcase may include computer readable program code configured to issue commands to enable the critical point segments. These commands may be written in code native to the operating system in which the testcase will be run, such as IBM z/OS environment, or any other environment as would be known to one of skill in the art. Each command may reference a unique identifier of one or more critical points, thereby allowing the critical point to be accessed in the executing code of the software under test. Additionally, each command may determine an appropriate response action and may determine each specific caller of the software under test. This allows for this information to be collected and/or used by a software developer/tester and/or a system to further refine the testing procedures. Also, each command may limit which of one or more critical points remains active based on a number of times the one or more critical points have been accessed in the executing code, such as by limiting the number of times to access a critical point, a number of times to skip a critical point, and/or a number of times to skip a critical point between accessing the critical point, etc. For example, if a critical point is accessed several times within a short period of time, e.g., 1 second, 5 seconds, 1 minute, 5 minutes, etc., the appropriate response action for the multiple accessed critical point may only execute once for all the accesses. In another example, if a critical point is accessed more than a number of times, e.g., one time, two times, five times, ten times, etc., the appropriate response action for the multiple accessed critical point may only execute once for all the accesses. In another example, if a critical point is reached 12 times, it may only be accessed every other time, every third time, every fourth time, etc. Of course, other ways of limiting superfluous responses based on multiple accessed critical point may also be used, as would be known to one of skill in the art.

In another embodiment, the critical point segment may include computer readable program code configured to execute the appropriate response action, among other actions, such as collecting data, determining callers of the software under test, determining connections, etc. In one embodiment, the appropriate response action may be one of abend, wait, and test a variable.

In order to identify each critical point segment as it is injected into the executing code, each critical point segment may include a unique critical point identifier, such as an alphanumeric string, a flag, a hexadecimal code, etc., which is unique to the critical point segment to which it is associated.

In another approach, the critical point segment may include computer readable program code configured to limit access to one or more critical points to one or more specific callers of the software under test. For example, some of the critical points may be accessible by all callers of the software under test, while others may only be accessible by callers having administrator rights. In another approach, other factors may be used to determine which callers have access to which critical points, such as location, terminal, privilege, etc.

In more approaches, the computer program product may include computer readable program code configured to output an appropriate response action for each critical point.

In another embodiment, a computer program product for executing injected error code includes a computer readable storage medium having computer readable program code embodied therewith. The computer readable program code includes computer readable program code configured to receive a unique identifier of each critical point segment injected into an executing code of software under test, to determine a critical point corresponding to each unique identifier in the executing code of the software under test, and to execute an appropriate response action for each critical point as the critical point is accessed in the executing code.

In one embodiment, this computer program product may be executable from a remote location to diagnose a local system, such as a service provider relationship to a customer site.

In one embodiment, a system may include a processor for executing computer readable program code and a computer readable storage medium having computer readable program code embodied therewith. The computer readable program code may be capable of any of the functionality previously described. For example, the computer readable program code, when executed by the processor, may cause the system to determine critical points in executing code of software under test, to determine an appropriate response action for each critical point based on an error encountered at each critical point, to inject a critical point segment into the executing code at a corresponding critical point, and to output a unique identifier of each critical point segment.

In addition, computer readable program code may be configured to build a testcase to invoke the software under test based on at least the unique identifier of each critical point segment, according to one embodiment. The testcase may include computer readable program code configured to issue commands to enable the critical point segments.

In one embodiment, each command may reference a unique identifier of one or more critical points, and each command may determine an appropriate response action and determines each specific caller of the software under test. Additionally, each command may limit which of one or more critical points remains active based on a number of times the one or more critical points have been accessed in the executing code, such as by limiting the number of times to access a critical point, a number of times to skip a critical point, and/or a number of times to skip a critical point between accessing the critical point, etc.

Also, in one approach, the critical point segment may include computer readable program code configured to execute the appropriate response action and a unique critical point identifier.

In addition, computer readable program code may be configured to output an appropriate response action for each critical point. Also, in some embodiments, the critical point segment may include computer readable program code configured to limit access to one or more critical points to one or more specific callers of the software under test.

According to one embodiment, the computer program product for injecting error code may be referred to as a software error injection service, which may be specifically designed to operate with an IBM z/OS platform. In this environment, the critical point code segment may be provided via a bilingual macro (referred to as IGWCRITP for this example), which may provide the following parameters:

```
?IGWCRITP MODULE(modulename) POINTID(pointid)
    GLOBAL| PRIMARYHOME | HOME |
    ASCB@(ascb@,alet)
    < ACTIVE(activevar)>
    < ABEND >
    < VARS(variable1<,variable2>) >
    ;
```

The command interface may provide, e.g., via z/OS operator commands (tied to the SMS address space for this example), the following code.

To enable the critical point:

```
V SMS,ERRORINJ,SET,MODULE(modulename)
            ,POINTID(pointid)
            <,JOBNAME(jobname) >
            <,ASID(asid) >
<,ACTION(|ABEND,Sxxx|Uxxx,r15,r0|) >
    |SET,value1<,value2>           |
    |CANCEL                        |
    |SUSPEND                       |
    |RESUME                        |
            <Times(1|times) >
            <SKIP(0|skip) >
        <REPEAT(1|repeat|*)>
```

To disable the critical point:

```
V SMS,ERRORINJ,RESET,MODULE(modulename)
            ,POINTID(pointid)
```

To display the critical points:

```
D SMS,ERRORINJ
    <,JOBNAME(jobname)>
    <,ASID(asid) >
```

Now, some practical applications are described, according to various embodiments.

In Use Case #1: A retryable abend (e.g., 0Cx) is desired in MODULEA after obtaining resource #1 (e.g., ENQ, latch, storage obtain, etc.). The purpose of this abend is to ensure that resource #1 is released as part of the recovery code in MODULEA.

```
MODULEA:
Begin Main:
        Stack recovery (retry=retrypoint);
        Obtain resource #1;
        IGWCRITP MODULE(modulea) POINTID(001) ABEND;
End Main;
Retrypoint:
        Release resource #1;
End MODULEA;
```

```
Testcase:
//JOBA JOB,
//COMAND1 EXEC PGM=MVSCMD
//SYSIN DD *
        V SMS,ERRORINJ,SET,MODULE(modulea),POINTID(001)
              ,ACTION(ABEND,S0C4)
//STEP1 EXEC PGM=MODULEA
     (ABEND 0C4 issued)
//COMAND2 EXEC PGM=MVSCMD
//SYSIN DD *
        V SMS,ERRORINJ,RESET,MODULE(modulea),POINTID(001)
//STEP2 EXEC PGM=MODULEA
/*
```

In the above example, if the MODULEA failed to release resource #1 (obtained during Obtain resource #1, and not released following the ABEND0C4), then problems in the next operation (e.g., hangs, storage leaks, etc.) might occur.

In Use Case #2, the software developer/tester has accidently caused a timing related deadlock by adding serialization resource #2 into MODULEB in a reverse order as MODULEA. MODULEA must suspend in between obtaining resource #1 and #2 after MODULEB obtains resource #2 in order to cause the deadlock.

```
MODULEA:
Begin Main:
Obtain Resource #1;
IGWCRITP MODULE(modulea) POINTID(002);
Obtain Resource #2;
End Main;
END MODULEA;
MODULEB:
Begin Main:
Obtain Reource #2;    ! New code
Obtain Resource #1;
End Main;
END MODULEB;
Testcase:
//JOBA JOB ,
//COMAND1 EXEC PGM=MVSCMD
//SYSIN DD *
V SMS,ERRORINJ,SET,MODULE(modulea),POINTID(002)
       ,ACTION(SUSPEND)
//STEP1 EXEC PGM=MODULEA
     (JOBA holds resource #1 and waits for resume command)
//JOBB JOB ,
//STEP1 EXEC PGM=MODULEB
     (JOBB holds resource #2 and waits for resource #1 held by JOBA)
```

```
//COMAND2 EXEC PGM=MVSCMD
//SYSIN DD *
V SMS,ERRORINJ,SET,MODULE(modulea),POINTID(002)
     ,ACTION(RESUME)
     (JOBA waits for resource #2 held by JOBB and are now deadlocked)
/*
```

In Use Case #3, MODULEA calls an external service and must respond appropriately to expected/unexpected return/reason codes.

```
MODULEA:
Begin Main:
Dcl LRecode Fixed(31);
Dcl LRSNCode Fixed(32);
Call Service1 (LRetcode,LRSNCode);
IGWCRITP MODULE(modulea) POINTID(003)
VARS(LRetcode,LRSNCode);
If LRetcode¬ = 0 then
Externalize_Error;
End Main;
End MODULEA;
Testcase:
//JOBA JOB ,
//COMAND1 EXEC PGM=MVSCMD
//SYSIN DD *
     V
SMS,ERRORINJ,SET,MODULE(modulea),POINTID(003),ACTION(SET,8,
24)
//STEP1 EXEC PGM=MODULEA
        (JOBA fails with RC=8 RSN=24 as expected)
```

In Use Case #4, performance measurements to calculate the total CPU time for MODULEA and display the result on the console are presented.

```
MODULEA :
Begin Main:
?CPUTIME(BeginCPUTime);
(module code)
?CPUTIME(EndCPUTime);
IGWCRITP MODULE(modulea) POINTID(004)
VARS(LDisplayCPUTime);
If LDisplayCPUTime = On 0 then
Do;
TotalCPUTime = EndCPUTime - BeginCPUTime;
?WTO 'Total CPU Time' =TotalCPUTime;
End;
End Main;
End MODULEA;
Testcase:
//JOBA JOB ,
//COMAND1 EXEC PGM=MVSCMD
//SYSIN DD *
V SMS,ERRORINJ,SET,MODULE(modulea),POINTID(003)
```

```
.ACTION(SET,1)
//STEP1 EXEC PGM=MODULEA
    (Total CPU Time = xxx)
```

Of course, the above practical applications are for illustration only, and limited to language used in IBM z/OS environments. The present invention is not so limited, and may be designed for any environment and may include more or less functionality than that shown above. Accordingly, the above Use Cases are not meant to be limiting on the invention in any way.

While various embodiments have been described above, it should be understood that they have been presented by way of example only, and not limitation. Thus, the breadth and scope of an embodiment of the present invention should not be limited by any of the above-described exemplary embodiments, but should be defined only in accordance with the following claims and their equivalents.

What is claimed is:

1. A computer program product for injecting error code, comprising:
    a non-transitory computer readable storage medium having computer readable program code embodied therewith, the computer readable program code comprising:
    computer readable program code configured to determine critical points in executing code of software under test;
    computer readable program code configured to build a testcase to invoke the software under test;
    computer readable program code configured to determine an appropriate response action for each critical point based on an error encountered at each critical point;
    computer readable program code configured to inject a critical point segment into the executing code at each corresponding critical point, wherein each critical point segment is capable of being selectively enabled and deactivated; and
    computer readable program code configured to output a unique identifier of each critical point segment,
    wherein the testcase includes computer readable program code configured to issue commands, and
    wherein each command limits which of one or more critical points remains active based on each of: a number of times the one or more critical points have been accessed in the executing code, a number of times a critical point has been skipped, and an amount of times a critical point has been accessed versus skipped.

2. The computer program product as recited in claim 1, wherein the computer readable program code configured to build the testcase to invoke the software under test is based on at least the unique identifier of each critical point segment.

3. The computer program product as recited in claim 2, wherein the testcase includes computer readable program code configured to issue commands to enable and skip the critical point segments.

4. The computer program product as recited in claim 3, wherein each command references a unique identifier of one or more critical points, and wherein each command determines an appropriate response action and determines each specific caller of the software under test.

5. The computer program product as recited in claim 3, wherein a critical point is skipped after the critical point has been accessed more than a predetermined number of times within a predetermined time span.

6. The computer program product as recited in claim 3, wherein each command limits which of one or more critical points remains active based on a number of times the one or more critical points have been accessed in the executing code, or a number of times a critical point has been skipped, or an amount of times a critical point has been accessed versus skipped.

7. The computer program product as recited in claim 1, wherein the critical point segment includes computer readable program code configured to execute the appropriate response action.

8. The computer program product as recited in claim 7, wherein the appropriate response action is selected from a group consisting of: abend, wait, and test a variable.

9. The computer program product as recited in claim 1, wherein the critical point segment includes a unique critical point identifier.

10. The computer program product as recited in claim 1, further comprising computer readable program code configured to output an appropriate response action for each critical point.

11. The computer program product as recited in claim 1, wherein the critical point segment includes computer readable program code configured to limit access to one or more critical points to one or more specific callers of the software under test.

12. A system, comprising:
    a processor; and
    a computer readable storage medium having computer readable program code embodied therewith, the computer readable program code comprising:
    computer readable program code that when executed by the processor, causes the system to determine critical points in executing code of software under test;
    computer readable program code that when executed by the processor, causes the system to build a testcase to invoke the software under test;
    computer readable program code that when executed by the processor, causes the system to determine an appropriate response action for each critical point based on an error encountered at each critical point;
    computer readable program code that when executed by the processor, causes the system to inject a critical point segment into the executing code at a corresponding critical point, wherein each critical point segment is capable of being selectively enabled and deactivated; and
    computer readable program code that when executed by the processor, causes the system to output a unique identifier of each critical point segment,
    wherein the testcase includes computer readable program code configured to issue commands, and
    wherein each command limits which of one or more critical points remains active based on each of: a number of times the one or more critical points have been accessed in the executing code, a number of times a critical point has been skipped, and an amount of times a critical point has been accessed versus skipped.

13. The system as recited in claim 12, wherein the computer readable program code configured to build the testcase to invoke the software under test is based on at least the unique identifier of each critical point segment.

14. The system as recited in claim 13, wherein the testcase includes computer readable program code configured to issue commands to enable and skip the critical point segments.

15. The system as recited in claim 14, wherein each command references a unique identifier of one or more critical points, and wherein each command determines an appropriate response action and determines each specific caller of the software under test.

16. The system as recited in claim 14, wherein each command limits which of one or more critical points remains active based on a number of times the one or more critical points have been accessed in the executing code, or a number of times a critical point has been skipped, or an amount of times a critical point has been accessed versus skipped, and wherein a critical point is skipped after the critical point has been accessed more than a predetermined number of times within a predetermined time span.

17. The system as recited in claim 12, wherein the critical point segment includes:
   computer readable program code configured to execute the appropriate response action; and
   a unique critical point identifier.

18. The system as recited in claim 12, further comprising computer readable program code configured to output an appropriate response action for each critical point.

19. The system as recited in claim 12, wherein the critical point segment includes computer readable program code configured to limit access to one or more critical points to one or more specific callers of the software under test.

20. A computer program product for executing injected error code, comprising:
   a non-transitory computer readable storage medium having computer readable program code embodied therewith, the computer readable program code comprising:
   computer readable program code configured to receive a unique identifier of each critical point segment injected into an executing code of software under test, wherein each critical point segment is capable of being selectively enabled and deactivated;
   computer readable program code configured to determine a critical point corresponding to each unique identifier in the executing code of the software under test;
   computer readable program code configured to build a testcase to invoke the software under test; and
   computer readable program code configured to execute an appropriate response action for each critical point as the critical point is accessed in the executing code,
   wherein the testcase includes computer readable program code configured to issue commands, and
   wherein each command limits which of one or more critical points remains active based on each of: a number of times the one or more critical points have been accessed in the executing code, a number of times a critical point has been skipped, and an amount of times a critical point has been accessed versus skipped.

* * * * *